US011470375B2

(12) United States Patent
Lee et al.

(10) Patent No.: US 11,470,375 B2
(45) Date of Patent: Oct. 11, 2022

(54) DIGITAL DEVICE AND METHOD OF PROCESSING DATA THEREIN

(71) Applicant: LG ELECTRONICS INC., Seoul (KR)

(72) Inventors: Eunjung Lee, Seoul (KR); Taeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/337,835

(22) PCT Filed: Sep. 20, 2017

(86) PCT No.: PCT/KR2017/010311
§ 371 (c)(1),
(2) Date: Mar. 28, 2019

(87) PCT Pub. No.: WO2018/062755
PCT Pub. Date: Apr. 5, 2018

(65) Prior Publication Data
US 2020/0014984 A1    Jan. 9, 2020

(30) Foreign Application Priority Data

Sep. 28, 2016 (KR) .......................... 10-2016-0124807

(51) Int. Cl.
*H04N 21/41* (2011.01)
*H04N 21/431* (2011.01)
(Continued)

(52) U.S. Cl.
CPC ..... *H04N 21/41265* (2020.08); *H04N 21/431* (2013.01); *H04N 21/43615* (2013.01); *H04N 21/485* (2013.01)

(58) Field of Classification Search
None
See application file for complete search history.

(56) References Cited

U.S. PATENT DOCUMENTS

2003/0160898 A1   8/2003  Baek et al.
2006/0075108 A1*  4/2006  Sylvain ............... H04L 65/1026
                                              709/227
(Continued)

FOREIGN PATENT DOCUMENTS

CN    102484685    5/2012
WO    2008033094   3/2008
WO    2016027960   2/2016

OTHER PUBLICATIONS

PCT International Application No. PCT/KR2017/010311, Notification of Transmittal of the International Search Report and the Written Opinion of the International Searching Authority, or Declaration dated Jan. 19, 2018, 12 pages.

(Continued)

*Primary Examiner* — Jason K Lin
(74) *Attorney, Agent, or Firm* — Lee, Hong, Degerman, Kang & Waimey PC

(57) ABSTRACT

Disclosed are a digital device and method of processing data therein. The present invention includes a communication interface unit communicating with one or more peripheral devices, a display unit, and a controller configured to form a connectivity manager including information on one or more connectible peripheral devices and display the connectivity manager on a screen. If the information on at least one peripheral device on the displayed connectivity manager is selected, the controller connects to a first peripheral device by sending a first control signal, receives first data from the connected first peripheral device, and displays the received first data on the screen. If the connectivity manager is called and information on a second peripheral device is selected, the controller connects to the second peripheral device by sending a second control signal and transmits the first data to the connected second peripheral device.

7 Claims, 24 Drawing Sheets

(51) Int. Cl.
      *H04N 21/436*      (2011.01)
      *H04N 21/485*      (2011.01)

(56) References Cited

U.S. PATENT DOCUMENTS

| | | | |
|---|---|---|---|
| 2007/0091168 A1* | 4/2007 | Lee | H04L 69/08 348/14.01 |
| 2008/0061578 A1* | 3/2008 | Igoe | H04L 12/2809 296/68.1 |
| 2009/0222757 A1* | 9/2009 | Gupta | H04N 5/44543 715/776 |
| 2010/0060791 A1 | 3/2010 | Maxson et al. | |
| 2011/0047581 A1 | 2/2011 | Caspi et al. | |
| 2012/0017237 A1 | 1/2012 | Pan | |
| 2014/0362294 A1* | 12/2014 | Majid | H04N 5/445 348/564 |
| 2015/0229696 A1 | 8/2015 | Kim et al. | |
| 2015/0373295 A1 | 12/2015 | Outters | |
| 2017/0019443 A1* | 1/2017 | Conan | H04N 21/8186 |

OTHER PUBLICATIONS

European Patent Office Application Serial No. 17856641.0, Search Report dated Mar. 11, 2020, 8 pages.
The State Intellectual Property Office of the People's Republic of China Application Serial No. 201780059412.4, Office Action dated Nov. 3, 2020, 9 pages.

\* cited by examiner

[Fig. 1]
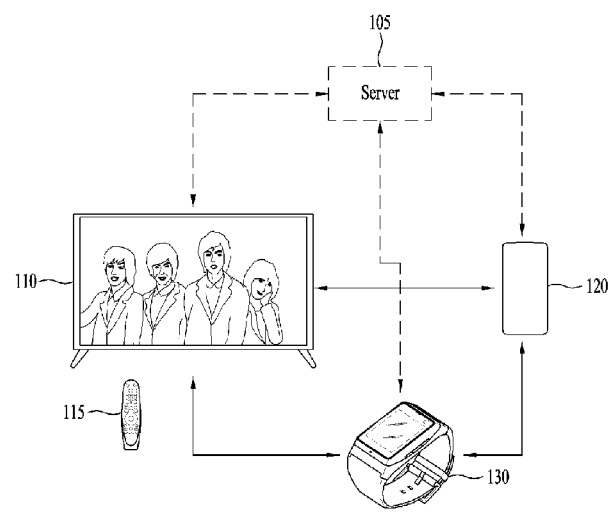

[Fig. 2]
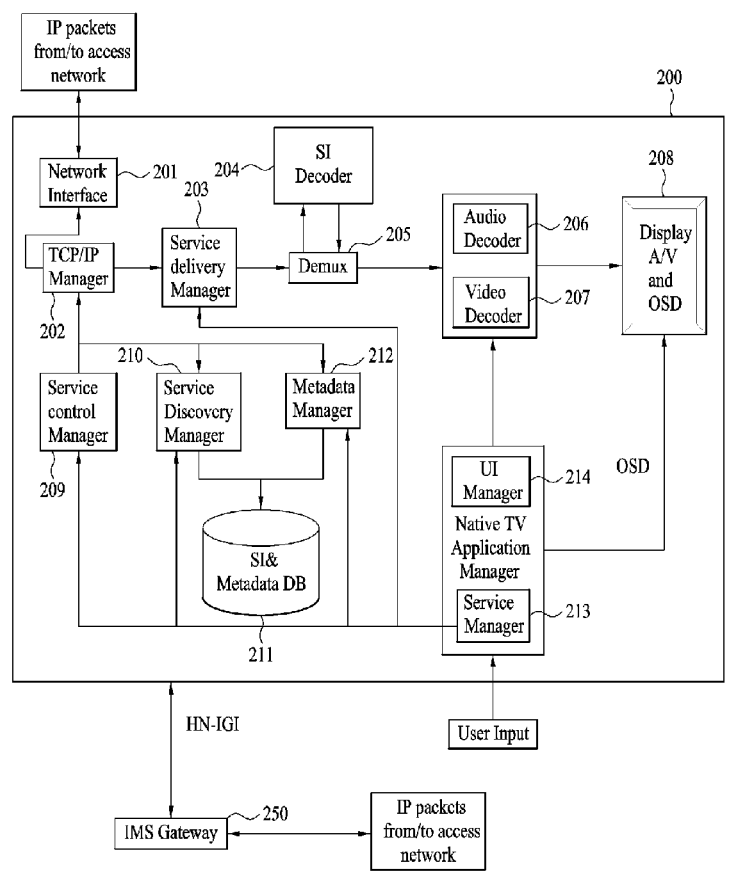

[Fig. 3]
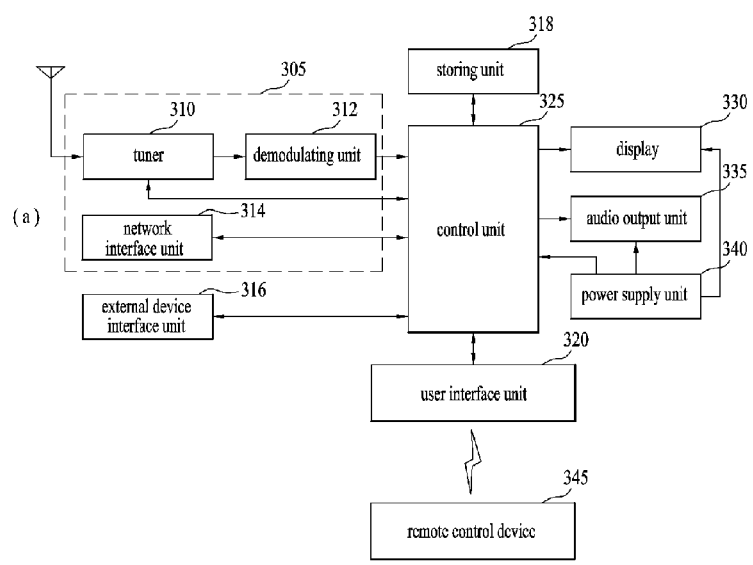
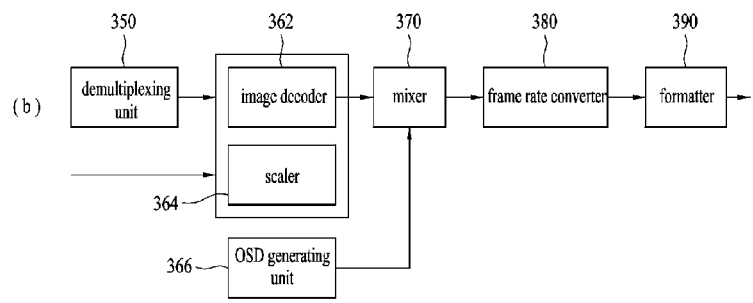

[Fig. 4]
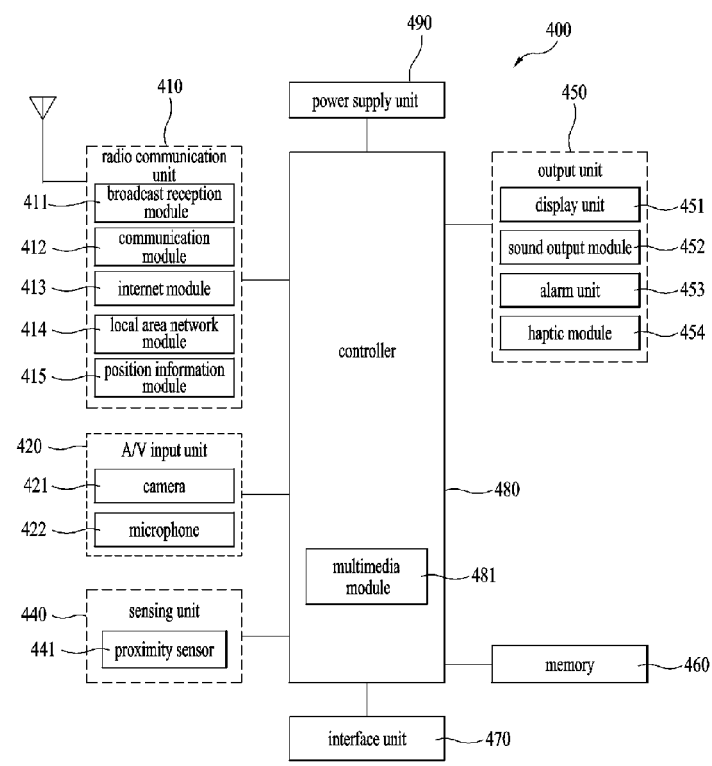

[Fig. 5]
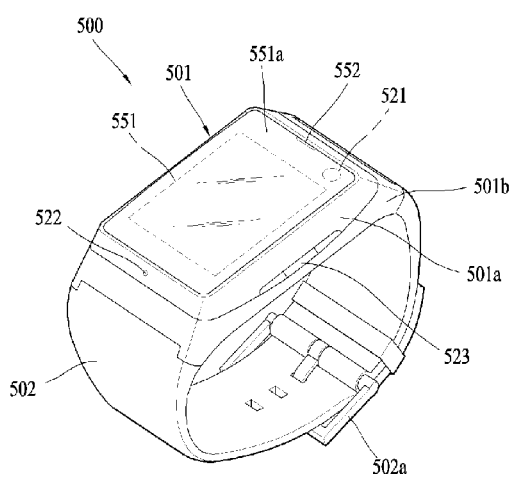

[Fig. 6]
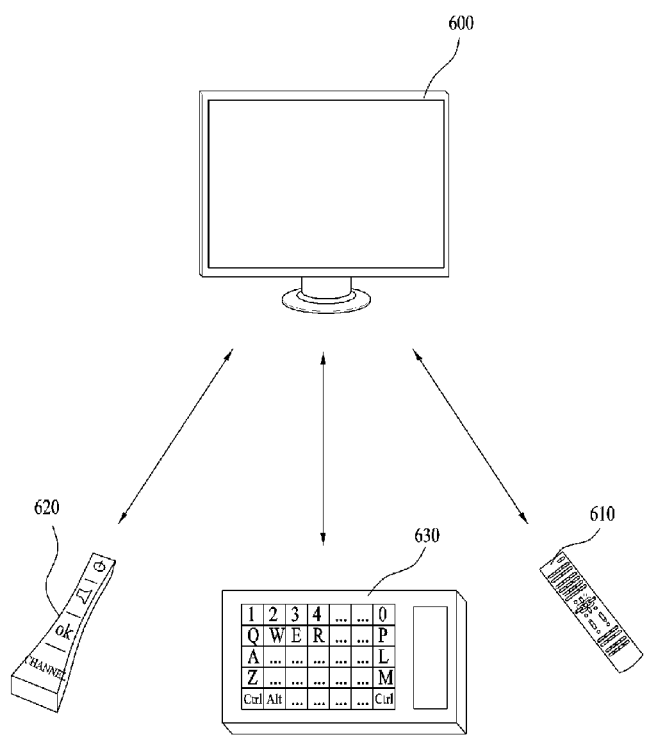

[Fig. 7]
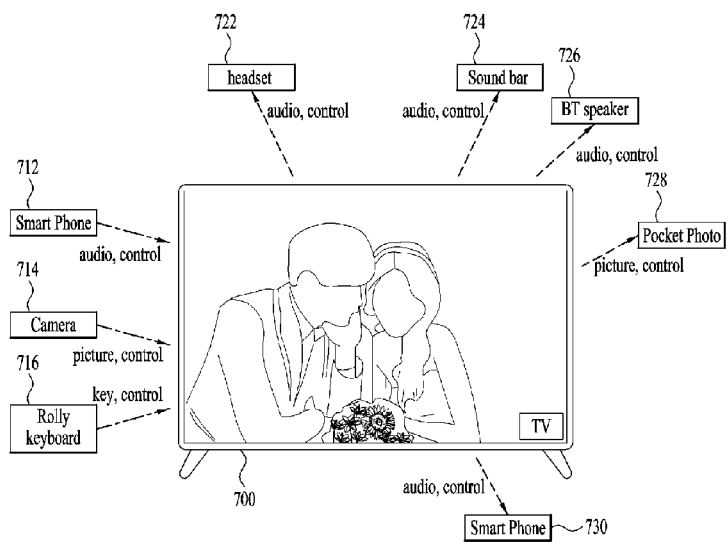

[Fig. 8]
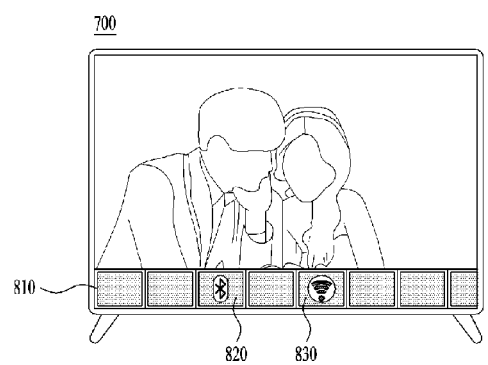

[Fig. 9]
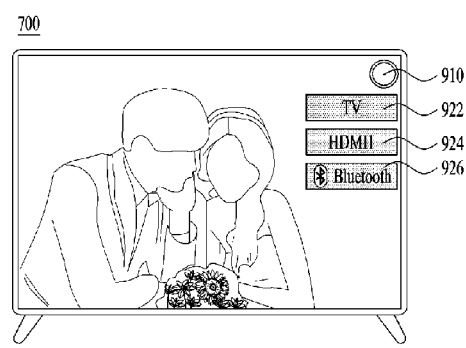

[Fig. 10]
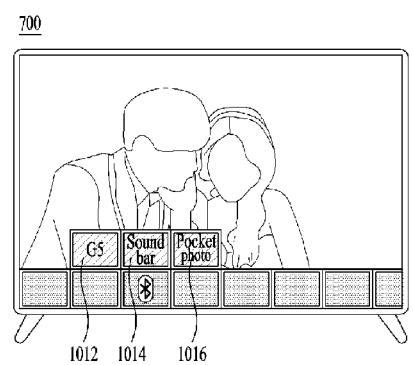

[Fig. 11]
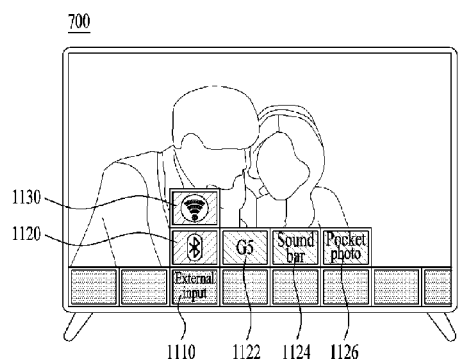

[Fig. 12]
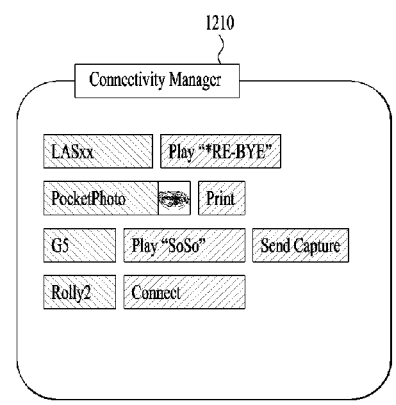

[Fig. 13]
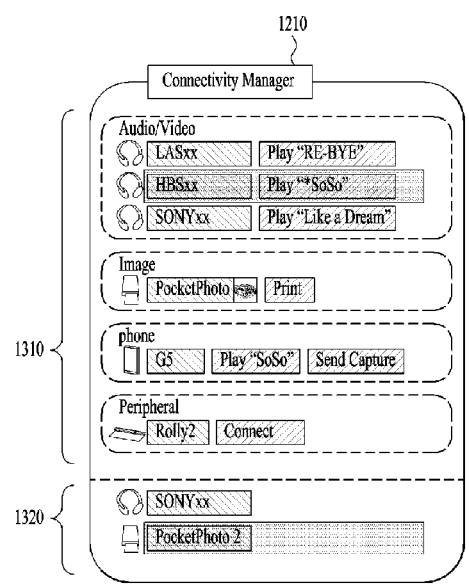

[Fig. 14]
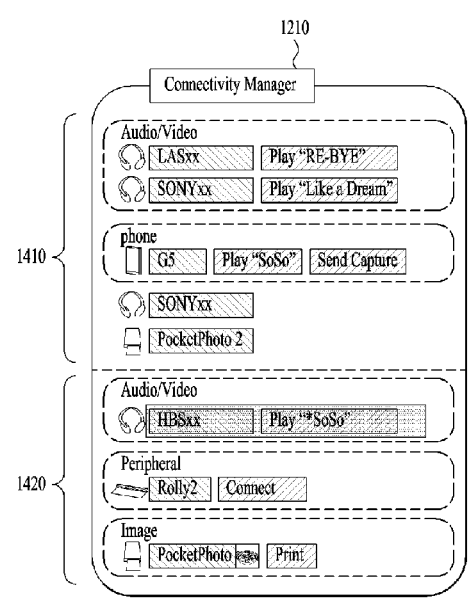

[Fig. 15]
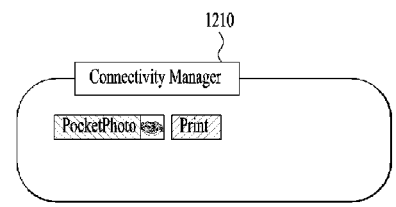

[Fig. 16]
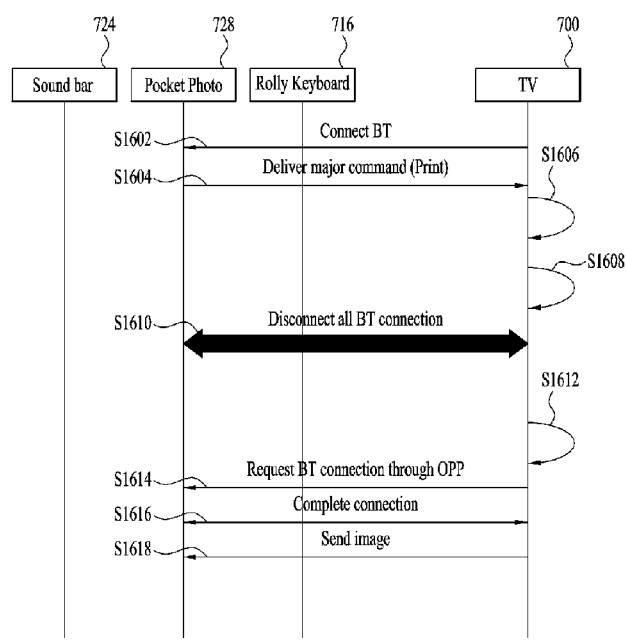

[Fig. 17]
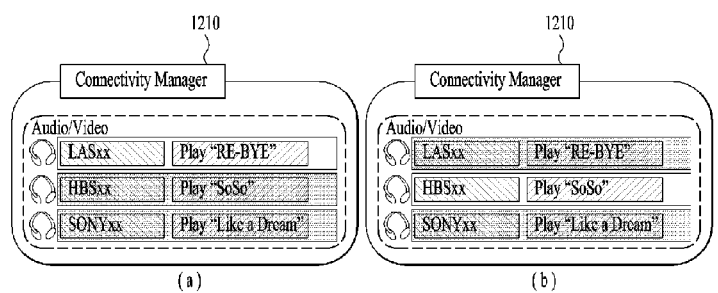

[Fig. 18]
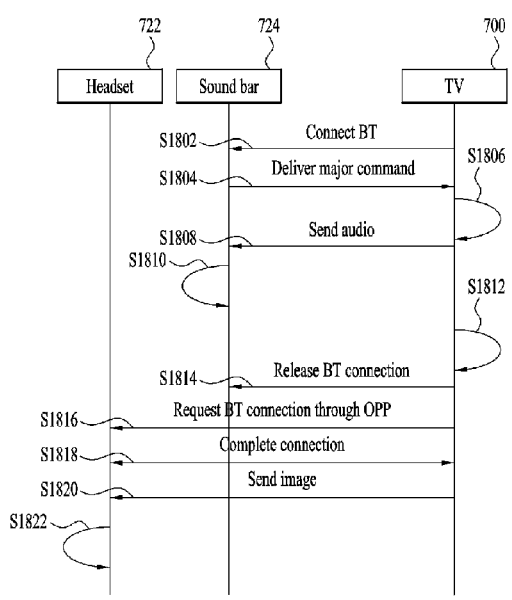

[Fig. 19]
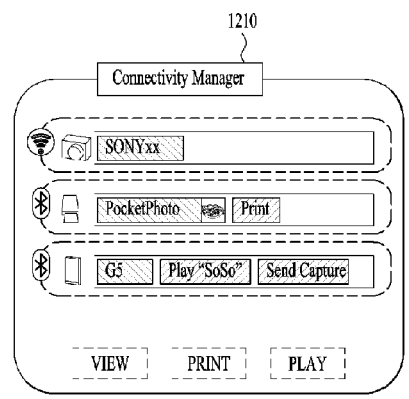

[Fig. 20]
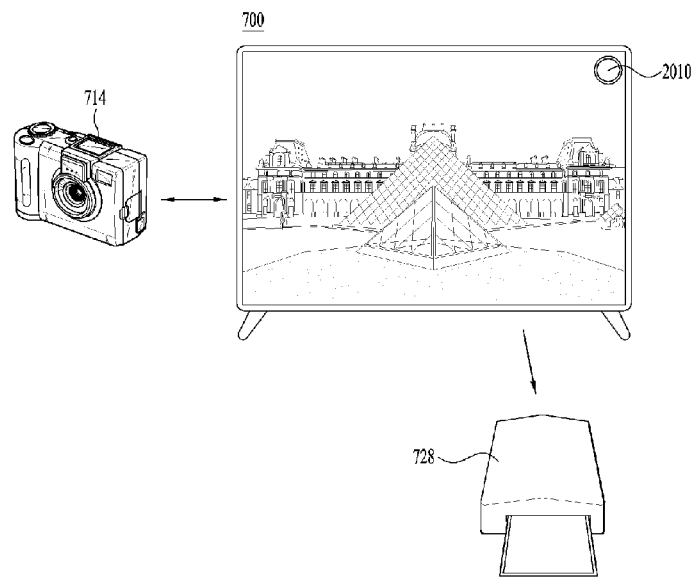

[Fig. 21]
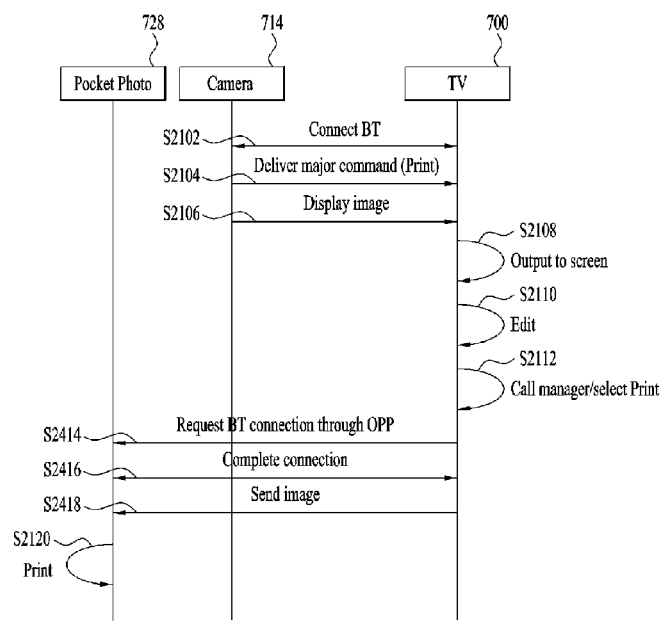

[Fig. 22]
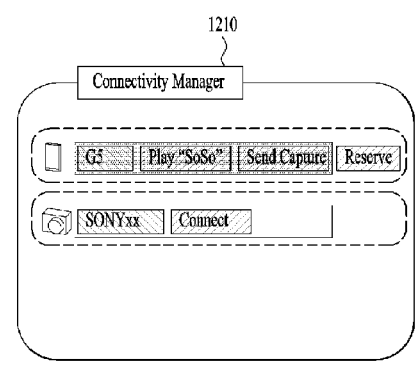

[Fig. 23]
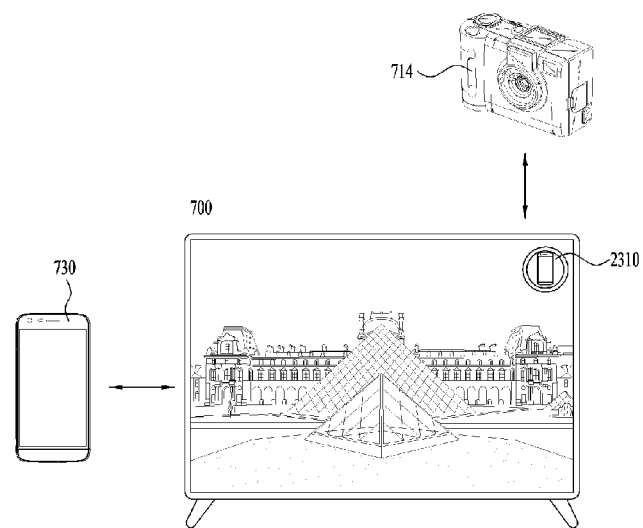

[Fig. 24]
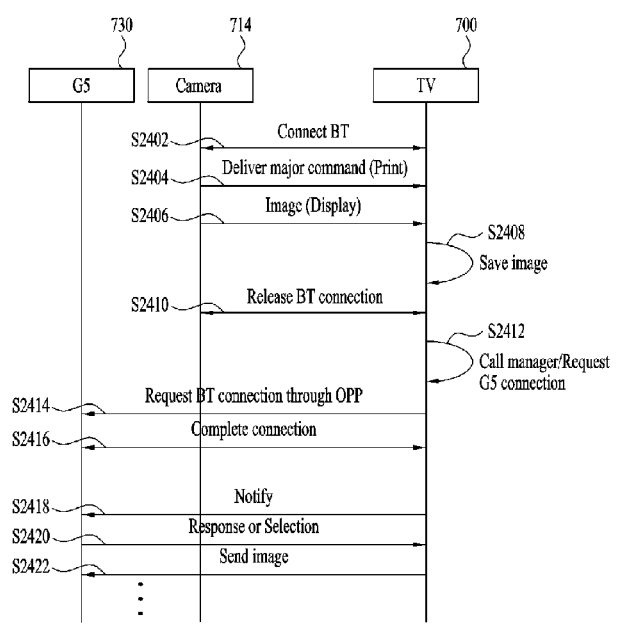

DIGITAL DEVICE AND METHOD OF PROCESSING DATA THEREIN

CROSS-REFERENCE TO RELATED APPLICATIONS

This application is the National Stage filing under 35 U.S.C. 371 of International Application No. PCT/KR2017/010311, filed on Sep. 20, 2017, which claims the benefit of earlier filing date and right of priority to Korean Application No. 10-2016-0124807, filed on Sep. 28, 2016, the contents of which are all hereby incorporated by reference herein in their entirety.

TECHNICAL FIELD

The present invention relates to a digital device, and more particularly, to a digital device and method of processing data therein, which is particularly suitable for data communications of one or more digital devices connected to one digital device via network.

BACKGROUND ART

Ongoing developments of mobile devices such as a smart phone, a tablet PC, a wearable device and the like are remarkable as well as the developments of standing devices such as a personal computer (PC), a television (TV) and the like.

Owing to the boom of digital convergence as well as to the developments of mobile devices, many ongoing efforts are made to research and develop mutual data communications and technologies thereof. So to speak, mutual data communications, controls and the like are performed among a plurality of digital devices. Recently, the interest in the IoT (Internet of Things) devices is increasingly rising. For instance, many attempts to control the IoT devices through a prescribed digital device are currently made.

For examples, devices connectible to a digital TV are diversified. In order to use such devices for a digital TV, a pairing process is necessary. Yet, if such a pairing process is performed each time, it may cause inconvenience to a user. To resolve such inconvenience, if the connectible devices are connected in advance, it eventually occupies the corresponding resource of the digital TV so as to put limitation on functionality of the digital TV. This cause inconvenience to the user as well.

DISCLOSURE

Technical Problem

Accordingly, embodiments of the present invention are directed to a digital device and method of processing data therein that substantially obviate one or more problems due to limitations and disadvantages of the related art.

One object of the present invention is to provide a digital device and method of processing data therein, by which data communications can be smoothly performed among a plurality of digital devices.

Another object of the present invention is to provide a digital device and method of processing data therein, by which data communications with subdevice(s) or operating device(s), controls and the like can be performed intuitively and efficiently using a main or control device among a plurality of the digital devices.

Further object of the present invention is to provide a digital device and method of processing data therein, which enables a control device to control one or more operating devices simultaneously or sequentially and perform status checks, operation controls and the like variously.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solution

Additional advantages, objects, and features of various embodiments for a digital device and method of processing data therein will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a digital device according to one embodiment of the present invention may include a communication interface unit communicating with one or more peripheral devices, a display unit, and a controller configured to form a connectivity manager including information on one or more connectible peripheral devices and display the connectivity manager on a screen, the controller configured to if the information on at least one peripheral device on the displayed connectivity manager is selected, connect to a first peripheral device by sending a first control signal, the controller configured to receive first data from the connected first peripheral device and display the received first data on the screen, wherein if the connectivity manager is called and information on a second peripheral device is selected, the controller is further configured to connect to the second peripheral device by sending a second control signal and transmit the first data to the connected second peripheral device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Advantageous Effects

Accordingly, embodiments of the present invention provide various effects and/or features.

According to one of various embodiments of the present invention, data communications can be smoothly performed among a plurality of digital devices.

According to one of various embodiments of the present invention, data communications with subdevice(s), peripheral device(s), or operating device(s), controls and the like can be performed intuitively and efficiently using a main or control device among a plurality of the digital devices.

According to one of various embodiments of the present invention, a control device can control one or more operating devices simultaneously or sequentially and perform status checks, operation controls and the like variously.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1 is a schematic diagram of a service system according to one embodiment of the present invention;

FIG. 2 is a block diagram of a digital device according to one embodiment of the present invention;

FIG. 3 is a block diagram for a different/detailed configuration shown in FIG. 2;

FIG. 4 is a block diagram of a peripheral device according to one embodiment of the present invention;

FIG. 5 is a diagram of a digital device or a peripheral device according to another embodiment of the present invention;

FIG. 6 is a diagram of a control means for controlling a digital device according to one embodiment of the present invention;

FIG. 7 is a diagram to describe a service system including a main device and peripheral device(s) according to one embodiment of the present invention;

FIGS. 8 to 11 are diagrams to describe a method of connecting a main device to a peripheral device according to one embodiment of the present invention;

FIGS. 12 to 14 are diagrams of a user interface provided by a main device for connection/control of a peripheral device and the like according to one embodiment of the present invention;

FIG. 15 and FIG. 16 are diagrams to describe a process for performing data communication between a digital TV and a pocket photo according to one embodiment of the present invention;

FIG. 17 and FIG. 18 are diagrams to describe a method of performing data communications with peripheral devices of the same attribute in a main device according to one embodiment of the present invention;

FIGS. 19 to 21 are diagrams to describe a method of performing data communications between a main device and a plurality of peripheral devices according to one embodiment of the present invention; and FIGS. 22 to 24 are diagrams to describe a method of performing data communications between a main device and a plurality of peripheral devices according to another embodiment of the present invention.

BEST MODE

Description will now be given in detail according to various embodiment(s) for a digital device and data processing method therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first~', 'second~' and the like is provided to facilitate the description of the corresponding terminologies only, which is non-limited by such terminologies or ordinal numbers. Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies. Meanwhile, the descriptions disclosed in the present specification and/or drawings correspond to one preferred embodiment of the present invention and are non-limited by the preferred embodiment. And, the scope/extent of the right should be determined through the appended claims.

'Digital device' described in the present specification includes any device capable of performing at least one of transmission, reception, processing and output of contents for example. The digital device can receive the content or information on the content by streaming or download through a server (e.g., a broadcasting station), an external input or the like. The digital device may transmit/receive data including the content to/from the server or the like through a wire/wireless network. The digital device may include one of a fixed (or standing) device and a mobile device. The standing devices may include Network TV, HBBTV (Hybrid Broadcast Broadband TV), Smart TV, IPTV (Internet Protocol TV), PC (Personal Computer), etc. And, the mobile devices may include PDA (Personal Digital Assistant), Smart Phone, Tablet PC, Notebook, Digital Broadcast Terminal, PMP (portable multimedia player), Navigation, Slate PC, Ultrabook, Wearable Device (e.g., watch type terminal, glass type terminal, HMD (head mounted display), etc. In the following, for examples of digital devices, FIG. 2 and FIG. 3 show a digital TV as one of the standing devices and FIG. 4 and FIG. 5 show a mobile terminal and a wearable device (e.g., a smart watch) as the mobile devices, respectively. And, such digital devices shall be described in detail for the corresponding parts. If the digital device is the standing device, it may have include a signage having a display panel only or a SET type with another configuration such as a set-top box (STB) and the like.

In the above description, the wire/wireless network described in the present specification includes all hardware and/or software for a connection, pairing, data communication and the like between a server and a digital device, and also includes all networks supported currently or all networks that will be supported in the future, by Standards. The wire/wireless network is capable of supporting one or more communication protocols for data communications. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, a digital device may use a universal OS (operating system), a Web OS and the like. Hence, the digital device can process adding, deleting, amending, updating and the like of various services or applications on Universal OS kernel or Linux kernel, through which a further user-friendly environment can be configured and provided.

A digital device according to one embodiment of the present invention includes a communication interface unit communicating with one or more peripheral devices, a display unit, and a controller configured to form a connectivity manager including information on one or more connectible peripheral devices and display the connectivity manager on a screen, the controller configured to if the information on at least one peripheral device on the displayed connectivity manager is selected, connect to a first peripheral device by sending a first control signal, the controller configured to receive first data from the connected first peripheral device and display the received first data on the screen, wherein if the connectivity manager is called and information on a second peripheral device is selected, the controller is further configured to connect to the second peripheral device by sending a second control signal and transmit the first data to the connected second peripheral device.

FIG. 1 is a schematic diagram illustrating a service system according to one embodiment of the present invention.

Referring to FIG. 1, a service system may be implemented by including a plurality of digital devices 110, 120 and 130 capable of performing data communications by communicating with each other. Herein, for the communications or data communications among a plurality of the digital devices 110, 120 and 130 or for at least one of a plurality of the digital devices 110, 120 and 130, a server 105 may be further included in the service system. Meanwhile, in some cases, the server 105 may include one of various processors or devices such as a gateway, a relay, a gap filler, a communication relay and the like and perform functions with them.

Meanwhile, although the digital TV 110, the smartphone 120 and the smartwatch 130 are illustrated as the digital devices, various devices such as a camera, a keyboard, a headset, a sound bar, a speaker, a printer (e.g., pocket photo), a vehicle, an air conditioner, a refrigerator, an electric cooker, an electric cleaner (or robot cleaner) and the like can be included in the digital devise in association with the present invention. Meanwhile, at least one digital device (named 'main device' hereinafter) among a plurality of the digital devices can control the rest of the digital device(s) (named 'peripheral device(s)'). Data communications between the main device and the peripheral device(s), particular control processes and the like shall be described in detail later.

With reference to FIGS. 2 to 5, configuration block diagrams of the digital devices shown in FIG. 1 are described for example. FIGS. 2 to 5 in the following may include configuration block diagrams of the aforementioned main or peripheral devices. Meanwhile, in the present invention, a main/peripheral device may include a single device or a plurality of devices. So to speak, it is able to control at least one peripheral device using at least one main device.

FIG. 2 is a block diagram showing a digital TV according to one embodiment of the present invention.

In the following, referring to FIG. 2, the digital TV 200 may include a network interface 201, a TCP/IP manager 202, a service delivery manager 203, an SI decoder 204, a demuxer or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (internet protocol) packet(s) or IP datagram(s) (hereinafter named IP pack(s)) to/from the server 105 through a network. For instance, the network interface 201 may receive services, applications, contents, broadcast programs and the like from the server 105 shown in FIG. 1 via such a medium as terrestrial, cable, satellite, IP and the like through a network.

The TCP/IP manager 202 may involve delivery of IP packets transmitted to the digital TV 200 and IP packets transmitted from the digital TV 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using RTP/RTCP. In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (System Information/Service Information/Signaling Information) data and the like and then transmit the demultiplexed data to the audio/video decoder 206/207 and the SI decoder 204, respectively.

The SI decoder 204 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service informations to the SI & metadata DB 211. The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital TV 200. So to speak, the application manager can administrate the overall states of the digital TV 200, provide a user interface (UI), and manage other mangers.

The UI manager 214 provides a graphical user interface/user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212. The service manager 213 creates a channel map and controls a selection of a channel and the like using the created channel map in response to a key input received from the UI manager 214. The service manager 213 may receive service information from the SI decoder 204 and then sets an audio/video PID of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information. The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system. The SI & metadata database 211 may be implemented with non-volatile RAM (NVRAM), flash memory and the like.

Meanwhile, an IMS gateway 250 is a gateway in which functions required for an access to an IMS based IPTV service are collected.

In FIG. 2, the network interface 201, at least one configuration of the application manager, a user interface 320 to be described in FIG. 3, one configuration of a wireless communication unit 410 or an interface 470 to be mentioned in FIG. 4, one configuration mentioned in FIG. 5 and the like may provide interfaces for communications or data communications with a user, other digital devices and the like and exchange data including control data with each other.

FIG. 3 is a block diagram showing another configuration or detailed configuration of FIG. 2.

Referring to FIG. 3 (a), a digital TV may include a broadcast receiving unit 305, an external device interface 316, a storage unit 318, a user interface 320, a controller 325, a display unit 330, an audio output unit 335, a power supply unit 340, and a photographing unit (not shown). Herein, the broadcast receiving unit 305 may include at least one of one tuner 310, a demodulator 312, and a network interface 314. Yet, in some cases, the broadcast receiving unit 305 may include the tuner 310 and the demodulator 312 without the network interface 314, or may include the network interface 314 without the tuner 310 and the demodulator 312. The broadcast receiving unit 305 may include a multiplexer (not shown) to multiplex a signal, which is subjected to the tuner 310 and demodulated by the demodulator 312, and a signal received through the network interface 314. In addition, the broadcast receiving unit 305 can include a demultiplexer (not shown) and demultiplex the multiplexed signal, the demodulated signal, or a signal received through the network interface 314.

The tuner 310 may receive a radio frequency (RF) broadcast signal by tuning in to a channel selected by the user or all previously stored channels among RF broadcast signals received through an antenna. And, the tuner 310 converts the received RF broadcast signal into an IF (intermediate frequency) signal or a baseband signal. For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 310 is able to process both of the digital broadcast signal and the analog signal. The analog baseband video/audio signal (CVBS/SIF) outputted from the tuner 310 may be directly inputted to the controller 325. The tuner 310 may receive an RF broadcast signal of a single carrier or multiple carriers. The tuner 310 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal).

The demodulator 312 receives and demodulates the digital IF signal (DIF) converted by the tuner 310 and is then able to channel decoding and the like. To this end, the demodulator 312 may include a Trellis decoder, a de-interleaver, a Reed-Solomon decoder and the like, or may include a convolution decoder, a de-interleaver, a Reed-Solomon decoder and the like. The demodulator 312 performs demodulation and channel decoding and is then able to output a stream signal TS (transport stream). In this case, the stream signal may include a signal of multiplexing a video signal, an audio signal and/or a data signal. For instance, the stream signal may include MPEG-2 TS (transport stream) in which a video signal of PMEG-2 and an audio signal of Dolby AC-3 are multiplexed. The stream signal outputted from the demodulator 312 may be inputted to the controller 325. The controller 325 can control demultiplexing, audio/video signal processing, etc. Furthermore, the controller 325 can control outputs of video and audio through the display 330 and the audio output unit 335, respectively.

The external device interface 316 may provide an interfacing environment between the digital device 300 and various external devices. To this end, the external device interface 316 may include an A/V input/output unit (not shown) or a wireless communication unit (not shown). The external device interface 316 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 316 delivers a signal containing data such as an image, a video, an audio and the like, which is inputted through the connected external device, to the controller 325 of the digital TV. The controller 325 may control a data signal of the processed image, video and audio and the like to be outputted to the connected external device. To this end, the external device interface 316 may further include an A/V input/output unit (not shown) or a wireless communication unit (not shown).

In order to input video and audio signals of an external device to the digital TV, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The wireless communication unit can perform short-range wireless communication with another digital device. The digital TV may be networked with other digital devices by communication protocols such as Bluetooth, radio frequency identification (RFID), infrared data association (IrDA), ultra wideband (UWB), ZigBee, and digital living network alliance (DLNA), etc. for example.

Moreover, the external device interface 316 may perform input/output operations with a set-top box (STB) by being connected thereto through at least one of the aforementioned terminals. Meanwhile, the external device interface 316 may receive an application or an application list within an adjacent external device and then forward it to the controller 325 or the storage unit 318.

The network interface 314 may provide an interface for connecting the digital TV to wired/wireless networks including Internet network. The network interface 314 may have Ethernet terminal and the like for an access to a wired network for example. For the access to the wireless network, the network interface 314 may use communication specifications such as WLAN (Wireless LAN) (Wi-Fi), Wibro (Wireless broadband), Wimax (World Interoperability for Microwave Access), HSDPA (High Speed Downlink Packet Access), etc. The network interface 314 may transceive data with another user or another digital device through the accessed network or another network linked to the accessed network. Particularly, the network interface 314 may send a portion of the content data stored in the digital TV to a user/digital device selected from other users/digital devices previously registered at the digital TV. Meanwhile, the network interface 314 may access a prescribed webpage through the accessed network or another network linked to the accessed network. Namely, the network interface 314 accesses a prescribed webpage through a network and is then able to transceive data with a corresponding server. Besides, the network interface 314 can receive contents or data provided by a content provider or a network operator. Namely, the network interface 314 may receive contents (e.g., movie, advertisement, game, VOD, broadcast signal, etc.) provided by the content provider or a network provider and information associated with the contents through the network. The network interface 314 may receive update information and file of firmware provided by the network operator.

And, the network interface 314 may send data to the internet or content provider or the network operator. Moreover, the network interface 314 may select a desired application from open applications and receive it through a network.

The storage unit 318 may store programs for various signal processing and controls within the controller 325, and may also store a processed video, audio or data signal. In addition, the storage unit 318 may execute a function of temporarily storing a video, audio or data signal inputted from the external device interface 316 or the network interface 314. The storage unit 318 may store information on a prescribed broadcast channel through a channel memory function. The storage unit 318 may store an application or an application list inputted from the external device interface 316 or the network interface 314. And, the storage unit 318 may store various platforms which will be described later. The storage unit 318 may include storage media of one or more types, such as a flash memory type, a hard disk type, a multimedia card micro type, a card type memory (e.g. SD or XD memory), RAM, EEPROM, etc. The digital TV may play content files (a video file, a still image file, a music file, a text file, an application file, etc.) stored in the storage unit 318 and provide them to the user. FIG. 3 (*a*) illustrates an embodiment in which the storage unit 318 is separated from the controller 325, by which the present invention is non-limited. In other words, the storage unit 318 may be included in the controller 325.

The user interface 320 may forward a signal inputted by a user to the controller 325 or forward a signal outputted from the controller 325 to the user. For example, the user input interface 320 may receive control signals for power on/off, channel selection, screen settings and the like from a remote control device 345, or transmit control signals of the controller 325 to the remote control device 345, according to various communication schemes such as RF communication, IR communication, and the like. The user interface 320 can forward control signals inputted through a power key, a channel key, a volume key, and a local key (not shown) for a setup value or the like to the controller 325. The user interface 320 may forward a control signal inputted from a sensing unit (not shown) sensing a gesture of a user to the controller 325 or transmit a signal of the controller 325 to the sensing unit (not shown). Here, the sensing unit (not shown) may include a touch sensor, a voice sensor, a location sensor, an action sensor, etc.

The controller 325 may generate and output a signal for a video or audio output by demultiplexing a stream inputted through the tuner 310, the demodulator 312 or the external device interface 316 or processing demultiplexed signals. A video signal processed by the controller 325 can be inputted to the display unit 380 and displayed as an image corresponding to the video signal. In addition, the video signal video-processed by the controller 325 can be inputted to an external output device through the external device interface 316. An audio signal processed by the controller 325 can be audio-outputted to the audio output unit 335. Moreover, the audio signal processed by the controller 325 can be inputted to the external output device through the external device interface 316. The controller 325 may include a demultiplexer, an image processor, and the like, which are not shown in FIG. 3 (*a*). The controller 325 can control the overall operations of the digital TV. For example, the controller 325 can control the tuner 310 to tune in to an RF broadcast corresponding to a channel selected by a user or a previously stored channel. The controller 325 can control the digital TV according to a user command input through the user input interface 320 or an internal program. Particularly, the controller 325 can control the digital TV to access a network to download an application or an application list desired by a user to the digital TV. For example, the controller 325 may control the tuner 310 to receive a signal of a channel selected in response to a prescribed channel selection command received through the user input interface 320. And, the controller 325 may process a video, audio or data signal of the selected channel. The controller 325 may control information on a channel selected by the user to be outputted together with a processed video or audio signal through the display unit 330 or the audio output unit 335. For another example, the controller 325 may control a video signal or an audio signal, which is inputted through the external device interface unit 316 from an external device (e.g., a camera or a camcorder), to be outputted through the display unit 330 or the audio output unit 335 in response to an external device image play command received through the user input interface 320. Meanwhile, the controller 325 can control the display unit 330 to display a video. For example, the controller 325 can control a broadcast video inputted through the tuner 310, an external input video inputted through the external device interface 316, a video inputted through the network interface 430, or a video stored in the storage unit 440 to be displayed on the display unit 330. Here, the video displayed on the display unit 330 may include a still image or moving images or may include a 2D or 3D video. The controller 325 may control a content to be played. Here, the content may include a content stored in the digital TV, a received broadcast content, or a content inputted externally. The content may include at least one of a broadcast video, an external input video, an audio file, a still image, an accessed web screen, and a document file. The controller 325 may control an application or an application list, which is located in the digital device 300 or downloadable from an external network, to be displayed when an application view menu is entered. The controller 325 may control installation and execution of applications downloaded from an external network together with various user interfaces. Moreover, the controller 325 can control a video related to a launched application to be displayed on the display unit 330 by a user's selection.

Meanwhile, a channel browsing processor (not shown) configured to generate a thumbnail image corresponding to a channel signal or an external input signal may be further included. The channel browsing processor may receive an input of a stream signal (TS) outputted from the demodulator 312 or an input of a stream signal outputted from the external device interface 316, extract a video from the inputted stream signal, and then generate a thumbnail image. The generated thumbnail image can be directly inputted to the controller 325 or may be inputted to the controller 325 by being encoded. Moreover, the generated thumbnail image may be encoded into a stream and then inputted to the controller 325. The controller 325 may display a thumbnail list including a plurality of thumbnail images on the display unit 330 using the inputted thumbnail images. The thumbnail images included in the thumbnail list can be updated sequentially or simultaneously. Accordingly, the user can conveniently check content of a plurality of broadcast channels.

The display unit 330 may convert each of a video signal, a data signal, and an OSD signal processed by the controller 325 or each of a video signal and a data signal received from the external device interface 316 into R, G and B signals to generate a drive signals. The display unit 330 may include PDP (Plasma Display Panel), LCD (Liquid Crystal Display), OLED (Organic Light Emitting Diode), a flexible display, a 3D display, or the like. The display unit 330 may be configured as a touchscreen and used as an input device as well as an output device. The audio output unit 335 receives a signal audio-processed by the controller 325, for example, a stereo signal, a 3.1 channel signal or a 5.1 channel signal, and then outputs the received signal as audio. The audio output unit 335 may be configured as one of speakers of various types.

Meanwhile, the digital TV may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 325 through the user input interface 320. The digital TV may further include a photographing unit (not shown) for photographing a user. Image information acquired by the photographing unit (not shown) can be inputted to the controller 325. The controller 325 may sense a gesture of a user from an image captured by the photographing unit (not shown) or a signal sensed by the sensing unit (not shown), or by combining the image and the signal.

The power supply unit 340 may supply a corresponding power to the digital TV overall. Particularly, the power supply unit 340 can supply the power to the controller 325 configurable as a system-on-chip (SoC), the display unit 330 for a video display, and the audio output unit 335 for an audio output. To this end, the power supply unit 340 may include a converter (not shown) configured to convert an AC power to a DC power. Meanwhile, for example, if the display unit 330 is configured as an LCD panel having a multitude of backlight lamps, the power supply unit 340 may further include an inverter (not shown) capable of PWM (pulse width modulation) operation for luminance variation or dimming drive.

The remote control device 345 sends a user input to the user input interface 320. To this end, the remote control device 345 can use Bluetooth, RF communication, IR communication, UWB, ZigBee, etc. In addition, the remote control device 345 can receive audio, video or data signal outputted from the user input interface 320 and then display the received signal or output the same as audio or vibration.

Regarding the digital device according to the present invention, some of the illustrated components may be omitted or new components (not shown) may be further added as required. On the other hand, the digital device may not include the tuner and the demodulator, differently from the aforementioned digital device, and may play a content by receiving the content through the network interface or the external device interface.

Referring to FIG. 3 (*b*), one example of the controller may include a demultiplexer 350, a video processor, an OSD generator 366, a mixer 370, a frame rate converter (FRC) 380, and a formatter 390. Besides, the controller may further include an audio processor and a data processor (not shown).

The demultiplexer 350 demultiplexes an inputted stream. For instance, the demultiplexer 350 can demultiplex an inputted stream signal into an MPEG-2 TS video, audio and data signals. Herein, the stream signal inputted to the demultiplexer may include a stream signal outputted from the tuner, demodulator or external device interface.

The video processor performs a video processing of the demultiplexed video signal. To this end, the video processor may include a video decoder 362 and a scaler 364. The video decoder 362 can decode the demultiplexed video signal, and the scaler 364 can scale the resolution of the decoded video signal to be outputtable from the display. The video decoder 362 can support various specifications. For instance, the video decoder 362 performs a function of MPEG-2 decoder if a video signal is encoded by MPEG-2. And, the video decoder 364 performs a function of H.264 decoder if a video signal is encoded by DMB (digital multimedia broadcasting) or H.264. Meanwhile, the video signal decoded by the image processor is inputted to the mixer 370.

The OSD generator 366 may generate OSD data according to a user input or by itself. For example, the OSD generator 366 may generate data to be displayed on the screen of the display 380 in the graphic or text form on the basis of a control signal of a user input interface. The generated OSD data may include various data such as a user interface screen of the digital device, various menu screens, widgets, icons, viewing rate information and the like. The OSD generator 366 can generate data to display a caption of a broadcast video or EPG based broadcast information.

The mixer 370 mixes the OSD data generated by the OSD generator 366 and the video signal processed by the video processor. The mixer 370 then provides the mixed signal to the formatter 390. By mixing the decoded video signal and the OSD data, OSD is displayed in a manner of overlaying a broadcast video or an external input video.

The frame rate converter (FRC) 380 may convert a frame rate of an inputted video. For example, the frame rate converter 380 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 380 can perform the conversion by inserting a first frame between the first frame and a second frame or inserting a third frame predicted from the first and second frames. For another instance, in case of converting a frame rate into 240 Hz from 60 Hz, the frame rate converter 380 can perform the conversion by further inserting three same or predicted frames between the existing frames. Meanwhile, in case of not performing a separate frame conversion, the frame rate converter 380 may be bypassed.

The formatter 390 may change the output of the frame rate converter 380, which is inputted thereto, to fit an output format of the display unit. For example, the formatter 390 can output an RGB data signal. In this case, this RGB data signal can be outputted as low voltage differential signal (LVDS) or mini-LVDS. If an inputted output of the frame rate converter 380 is a 3D video signal, the formatter 390 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal. And, the audio processor (not shown) in the controller can process base, treble, volume adjustment and the like. A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital TV is one example according to the present invention. And, at least one of the components may be integrated, added or omitted depending on options of an actually embodied digital TV. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention. Meanwhile, a digital TV may include an image signal processing device configured to process a signal of an image saved in the corresponding device or a signal of an inputted image. Examples of the image signal processing device may include a settop box (STB) failing to include the display unit 330 and the audio output unit 335 shown in FIG. 3 (a), the aforementioned DVD player, a Blu-ray player, a game device, a computer and the like.

FIG. 4 is a block diagram showing a mobile terminal according to one embodiment of the present invention.

In FIG. 4, illustrated is a configuration block diagram of a mobile terminal 120 as another embodiment of the digital device shown in FIG. 1.

Referring to FIG. 4, the mobile terminal 400 includes a wireless communication unit 410, an A/V (audio/video) input unit 420, a user input unit 430, a sensing unit 440, an output unit 450, a memory 460, an interface unit 470, a controller 480, a power supply unit 490, etc.

The wireless communication unit 410 typically includes one or more modules which permit wireless communication between the mobile terminal 400 and a wireless communication system or network within which the mobile terminal 400 is located. For instance, the wireless communication unit 410 can include a broadcast receiving module 411, a mobile communication module 412, a wireless Internet module 413, a short-range communication module 414, a location information module 415, etc.

The broadcast receiving module 411 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal. The broadcast associated information may include information associated with a broadcast channel, a broadcast program, or a broadcast service provider. Furthermore, the broadcast associated information can be provided via a mobile communication network. In this case, the broadcast associated information can be received by the mobile communication module 412. The broadcast associated information can be implemented in various forms, e.g., an electronic program guide (EPG), an electronic service guide (ESG), and the like. The broadcast receiving module 411 may be configured to receive digital broadcast signals using broadcasting systems such as ATSC, DVB-T (Digital Video Broadcasting-Terrestrial), DVB-S(Satellite), MediaFLO (Media Forward Link Only), DVB-H (Handheld), ISDB-T (Integrated Services Digital Broadcast-Terrestrial), and the like. Optionally, the broadcast receiving module 411 can be configured to be suitable for other broadcasting systems as well as the above-noted digital broadcasting systems. The broadcast signal and/or broadcast associated information received by the broadcast receiving module 411 may be saved to the memory 460.

The mobile communication module 412 transmits/receives wireless signals to/from at least one of a base station, an external terminal, and a server via a mobile network. Such wireless signals may carry audio signals, video signals, and data of various types according to transceived text/multimedia messages.

The wireless Internet module 413 includes a module for wireless Internet access and may be internally or externally coupled to the mobile terminal 400. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 414 is a module for short-range communications. Suitable technologies for implementing this module include Bluetooth, radio frequency identification (RFID), infrared data association (IrDA), ultra-wideband (UWB), ZigBee, RS-232, RS-385 and the like.

The location information module 415 is a module for obtaining location information of the mobile terminal 100. And, this module may be implemented with a global positioning system (GPS) module for example.

The audio/video (A/V) input unit 420 is configured to provide audio or video signal input. The A/V input unit 420 may include a camera 421, a microphone 422 and the like. The camera 421 receives and processes image frames of still pictures or video, which are obtained by an image sensor in a video call mode or a photographing mode. Furthermore, the processed image frames can be displayed on the display 451.

The image frames processed by the camera 421 can be stored in the memory 460 or transmitted externally via the wireless communication unit 410. Optionally, at least two cameras 421 can be provided according to the environment of usage.

The microphone 422 receives an external audio signal in call mode, recording mode, voice recognition mode, or the like. This audio signal is processed and converted into electrical audio data. The processed audio data is transformed into a format transmittable to a mobile communication base station via the mobile communication module 412 in call mode. The microphone 422 typically includes assorted noise cancelling algorithms to cancel noise generated in the course of receiving the external audio signal.

The user input unit 430 generates input data for a user to control an operation of the terminal. The user input unit 430 may include a keypad, a dome switch, a touchpad (e.g., static pressure/capacitance), a jog wheel, a jog switch, and/or the like.

The sensing unit 440 generates sensing signals for controlling operations of the mobile terminal 400 using status measurements of various aspects of the mobile terminal. For instance, the sensing unit 440 may detect an open/closed status of the mobile terminal 400, a location of the mobile terminal 400, an orientation of the mobile terminal 400, a presence or absence of user contact with the mobile terminal 400, an acceleration/deceleration of the mobile terminal 400, and the like. For example, if the mobile terminal 400 is moved or inclined, it is able to sense a location or inclination of the mobile device. Moreover, the sensing unit 440 may sense a presence or absence of power provided by the power supply unit 490, a presence or absence of a coupling or other connection between the interface unit 470 and an external device, and the like. Meanwhile, the sensing unit 440 may include a proximity sensor 441 such as NFC (near field communication) and the like.

The output unit 450 generates output relevant to the senses of vision, hearing and touch, and may include the display 451, an audio output module 452, an alarm unit 453, a haptic module 454, and the like.

The display 451 is typically implemented to visually display (output) information processed by the mobile terminal 400. For instance, if the mobile terminal is operating in phone call mode, the display will generally provide a user interface (UI) or graphical user interface (GUI) related to a phone call. For another instance, if the mobile terminal 400 is in video call mode or photographing mode, the display 451 may display photographed or/and received images or UI/GUI.

The display 451 may include at least one of a liquid crystal display (LCD), a thin film transistor-liquid crystal display (TFT-LCD), an organic light-emitting diode display (OLED), a flexible display and a three-dimensional display.

Some of the displays can be implemented in a transparent or optical transmittive type, which can be called a transparent display. A representative example of the transparent display is the TOLED (transparent OLED). A rear configuration of the display 451 can be implemented as the optical transmittive type as well. In this configuration, a user may be able to see an object located in rear of a terminal body through a region occupied by the display 451 of the terminal body.

Two or more displays 451 can be provided to the mobile terminal 400 in accordance with an implementation type of the mobile terminal 400. For instance, a plurality of displays can be disposed on the mobile terminal 400 in a manner of being spaced apart from a single face or being integrally formed on a single face. Alternatively, a plurality of displays may be disposed on different faces of the mobile terminal 400, respectively.

If the display 451 and a sensor (hereinafter called 'touch sensor') for detecting a touch action configure a mutual layer structure, the display 451 is usable as an input device as well as an output device. In this case, the touch sensor can be configured with a touch film, a touch sheet, a touchpad, or the like.

The touch sensor can be configured to convert a pressure applied to a specific portion of the display 451 or a variation of capacitance generated from a specific portion of the display 451 into an electrical input signal. Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 480. Therefore, the controller 480 is able to know whether a prescribed portion of the display 451 is touched.

A proximity sensor 441 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 452 functions in various modes including a call-receiving mode, a call-placing mode, a recording mode, a voice recognition mode, and a broadcast reception mode to output audio data which is received from the wireless communication unit 410 or stored in the memory 460. During operation, the audio output module 452 may output an audio signal related to a function (e.g., call received, message received) executed in the mobile terminal 400. The audio output module 452 may include a receiver, a speaker, a buzzer and the like.

The alarm unit 453 outputs a signal for announcing the occurrence of an event of the mobile terminal 400. Typical events occurring in the mobile device may include a call signal received, a message received, a touch input received, and the like. The alarm unit 453 may output a signal for announcing the event occurrence by way of vibration as well as video or audio signal. The video or audio signal can be outputted via the display 451 or the audio output module 452. Hence, the display 451 or the audio output module 452 can be sorted into a part of the alarm unit 453.

The haptic module 454 generates various tactile effects that can be sensed by a user. Vibration is a representative one of the tactile effects generated by the haptic module 454. The strength and pattern of the vibration generated by the haptic module 454 are controllable. For instance, different vibrations can be output in a manner of being synthesized together or can be output in sequence. The haptic module 454 is able to generate various tactile effects as well as the vibration. For instance, the haptic module 454 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 454 can be implemented to enable a user to sense the tactile effect through a muscle sense of a finger or an arm as well as to transfer the tactile effect through direct contact. Optionally, two or more haptic modules 454 can be provided to the mobile terminal 400 in accordance with a configuration type of the mobile terminal 400.

The memory 460 may store a program for an operation of the controller 480, or may temporarily store inputted/outputted data (e.g., phonebook, message, still image, video, etc.). And, the memory 460 may store data of vibrations and sounds of various patterns outputted in response to a touch input to the touchscreen.

The memory 460 may be implemented using any type or combination of suitable volatile and non-volatile memory or storage devices, including hard disk, RAM, SRAM, EEPROM, EPROM, PROM, ROM, magnetic memory, flash memory, magnetic or optical disk, multimedia card micro type memory, card-type memory (e.g., SD memory or XD memory), or other similar memory or data storage device. Furthermore, the mobile terminal 400 is able to operate in association with the web storage for performing a storage function of the memory 460 on the Internet.

The interface unit 470 may play a role as a passage to every external device connected to the mobile terminal 400 with external devices. The interface unit 470 receives data from the external devices, delivers a supplied power to the respective elements of the mobile terminal 400, or enables data within the mobile terminal 400 to be transferred to the external devices. For instance, the interface unit 470 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile terminal 400 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectible to the mobile terminal 400 through a port.

When the mobile terminal 400 is connected to an external cradle, the interface unit 470 becomes a passage for supplying the mobile terminal 400 with a power from the cradle or a passage for delivering various command signals input from the cradle by a user to the mobile terminal 400. Each of the various command signals inputted from the cradle or the power can operate as a signal for recognizing that the mobile terminal 400 is correctly installed in the cradle.

The controller 480 typically controls the overall operations of the mobile terminal 400. For example, the controller 480 performs the control and processing associated with voice calls, data communications, video calls, and the like. The controller 480 may include a multimedia module 481 that provides multimedia playback. The multimedia module 481 may be configured as a part of the controller 480, or implemented as a separate component. Moreover, the controller 480 is able to perform a pattern recognition processing for recognizing a writing input and a picture drawing input performed on the touchscreen as a text and an image, respectively. The power supply unit 490 is supplied with an external or internal power and then supplies a power required for an operation of each component, under the control of the controller 480.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 480.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 460, and executed by a controller or processor, such as the controller 480.

Meanwhile, beyond the dimension of user's hand-held use, a wearable device wearable on a body may operate or function as a digital device or an external device in the present specification. Such wearable devices may include a smart watch, smart glasses, an HMD and the like.

As shown in FIG. 1, a wearable device may exchange data with or interwork with another device mutually. The short-communication module 414 may detect (or recognize) a communication enabled wearable device around. If the detected wearable device is a device authenticated to communicate with the mobile terminal 400, the controller 480 may send at least one portion of data processed in the mobile terminal 400 to the wearable device. Hence, a user can use the data processed in the mobile terminal 400 through the wearable device. For instance, if an incoming call is received by the mobile terminal 400, a phone call is performed through the wearable device. If a message is received by the mobile terminal 400, the received message can be checked through the wearable device.

FIG. 5 is a diagram showing a digital device or an external device according to another embodiment of the present invention.

Referring to FIG. 5, a watch-type mobile terminal, i.e., a smartwatch 500 includes a main body 501 with a display unit 551 and a band 502 connected to the main body 501 to be wearable on a wrist. Generally, the smartwatch 500 may include the features or similar features of the mobile terminal 400 shown in FIG. 4.

The main body 501 may include a case having a certain appearance. As illustrated, the case may include a first case 501a and a second case 501b cooperatively defining an inner space for accommodating various electronic components. Other configurations are possible. For instance, a single case may alternatively be implemented, with such a case being configured to define the inner space, thereby implementing a mobile terminal 500 with a uni-body.

The smartwatch 500 is configured to enable wireless communication, and an antenna for the wireless communication can be installed in the main body 501. The antenna may extend its function using the case. For example, a case including a conductive material may be electrically connected to the antenna to extend a ground area or a radiation area.

The display unit 551 is disposed on the front side of the main body 501 so as to output information. The display unit 551 may include a touch sensor so as to implement a touchscreen. As illustrated, a window 551a of the display unit 551 is mounted on the first case 501a to form a front surface of the terminal body together with the first case 501a.

An audio output module 552, a camera 521, a microphone 522, a user input unit 523 and the like can be provided to the main body 501. When the display unit 551 is implemented as a touchscreen, it may function as the user input unit 523, whereby a separate key may not be provided to the main body 501.

The band 502 is commonly worn on the user's wrist and may be made of a flexible material for facilitating wearing of the device. As one example, the band 502 may be made of leather, rubber, silicon, synthetic resin, and/or the like. The band 502 may also be configured to be detachable from the main body 501. Accordingly, the band 502 may be replaceable with various types of bands according to a user's preference.

Meanwhile, the band 502 may be used in extending the performance of the antenna. For example, a ground extending unit (not shown) electrically connected to the antenna to extend a ground area may be embedded in the band 502.

The band 502 may be provided with a fastener 502a. The fastener 502a may be implemented into a buckle type, a snap-fit hook structure, a Velcro (trade mark) type, or the like, and include a flexible section or material. The drawing illustrates an example that the fastener 502a of a buckle type is implemented.

FIG. 6 is a diagram showing a control means for controlling a digital device according to one embodiment of the present invention.

In order to control a digital device 600, a front panel (not shown in the drawing) or a control means (e.g., an input means) provided to the digital device 600 is used.

Meanwhile, as a user interface device (UID) capable of a wire/wireless communication, the control means includes a remote controller 610, a key board 630, a pointing device 620, a touchpad, or the like, mainly embodied for the purpose of controlling the display device 600. And, a control means dedicated to an external input by being connected to the display device 600 may be included as well. Besides, the control means may further include a mobile device (e.g., a smartphone, a tablet PC, etc.) capable of controlling the display device 600 through a mode switching or the like despite not having the purpose of controlling the display device 600. For clarity, a pointing device is taken as one example for the description in the present specification, by which the present invention is non-limited.

The input means can communicate with the display device by employing at least one of communication protocols as necessary. In this case, the communication protocols may include Bluetooth, RFID, IrDA (infrared Data Association), UWB, ZigBee, DLNA, RS and the like.

The remote controller 610 is a general input means provided with various key buttons required for controlling the display device 600.

The pointing device 620 provided with a gyro sensor and the like delivers a prescribed control command to the display device 600 by embodying a corresponding pointer on a screen of the display device 600 based on a user's motion, a pressure, a rotation and the like. The pointing device 620 may be called one of various names such as a magic remote controller, a magic controller and the like.

As the display device 600 is an intelligence integrated display device capable of providing various services such as a web browser, an application, an SNS (social network service) and the like as well as broadcasts, it is difficult to control the display device 600 using a conventional remote controller 610. Hence, the keyboard 630 is embodied into a configuration similar to a PC keyboard to facilitate inputs of text and the like by complementing the control difficulty.

Meanwhile, the control means such as the remote controller 610, the pointing device 620, the keyboard 630, or the like is provided with a touchpad as necessary and is usable for the various control purposes of facilitating text inputs, pointer shifts, zoom-in/out of photo or video, and the like.

Data communications among a plurality of devices according to the present invention are described in detail as follows. For clarity, a plurality of the devices are classified into a main device and peripheral device(s) for the following description. In the present specification, the main device is described as a digital TV for example, by which the main device is non-limited. So, a mobile terminal such as a smartphone, a wearable device or the like may become a main device. Meanwhile, the peripheral devices may include various devices capable of exchanging data by being connected or connectible to the digital TV via network. So, the peripheral devices are described as a mobile terminal, a camera, a keyboard, a headset, a sound bar, a speaker, a printer (e.g., a pocket photo) and the like for example, by which the peripheral devices are non-limited.

According to the present invention, for example, a user is provided with a list of devices connected to a digital TV once or devices connectible to the digital TV is provided, thereby being able to identify information on a device failing to be connected yet. In providing such a list, the present invention provides control information thereof as well, thereby enabling a user to directly execute a control operation selected from control information of a specific device. In other words, according to a related art, if a device is selected and a connection is then established through the selected device, information is obtained from the connected device again and a user interface is then provided based on the obtained information. Subsequently, a control command for an operation selected from the provided user interface is sent so as to execute the corresponding operation. Yet, the present invention intends to perform a connection, a control operation and the like by a single selection.

FIG. 7 is a diagram to describe a service system including a main device and peripheral device(s) according to one embodiment of the present invention.

Referring to FIG. 7, a digital TV 700 (i.e., a main device) and peripheral devices connected or connectible to the digital TV 700 through a network are illustrated.

Referring to FIG. 7, the peripheral devices may include mobile terminals 712 and 730, a camera 714, a keyboard 716, a headset 722, a sound bar 724, a speaker 726, a pock photo 728 and the like for example, Herein, the digital TV 700 and the peripheral devices are mutually connected or/and perform communications, using at least one communication protocol. Meanwhile, each of the peripheral devices may use another peripheral device and another communication protocol for a connection to the digital TV 700.

Referring to FIG. 7, the mobile terminal 712, the camera 714 and the keyboard 716 among the peripheral devices may send at least one signal including audio data, image data, key data, control data and the like to the digital TV 700.

Meanwhile, the headset 722, the sound bar 724, the speaker 726, the pocket photo 729 and the mobile terminal 730 among the peripheral devices may receive at least one signal including audio data, image data, key data, control data and the like from the digital TV 700.

In the above description, among the peripheral devices, such a device configured to send data to the digital TV 700 (i.e., main device) as the mobile terminal 712, the camera 714, or the keyboard 716 may be described by being named a sending device. And, such a device configured to receive data from the digital TV 700 (i.e., main device) as the headset 722, the sound bar 724, the speaker 726, the pocket photo 729, or the mobile terminal 730 may be described by being named a receiving device.

So to speak, the digital TV 700 (i.e., main device) may receive data from at least one connected or connectible peripheral device and then process it in direct. And, the digital TV 700 may send prescribed data to at least one connected to connectible peripheral device, whereby the prescribed data can be processed by the corresponding device. Herein, 'processing' may be used as the meaning of including at least one of various operations such as an output of a related user interface, a sending/receiving of a control signal and the like as well as data decoding, an output to a screen and the like.

Various embodiments according to the present invention are illustrated in FIGS. 8 to 24. Each drawing and description thereof may become one embodiment and further become another embodiment by being combined with at least one another drawing and description thereof. Moreover, a plurality of embodiments can be derived from one drawing and content thereof. Likewise, although one description is made for a specific drawing in the present specification, it is made for clarity and convenience and a relevant material is applicable to other drawings in the same or similar manner. Meanwhile, the descriptions with reference to FIGS. 8 to 24 can apply by device units, application units, or the like.

FIGS. 8 to 11 are diagrams to describe a method of connecting a main device to a peripheral device according to one embodiment of the present invention.

With reference to FIGS. 8 to 11, a method for a main device to connect to a peripheral device according to the present invention is described.

In FIGS. 8 to 11, while a main device (i.e., a digital TV 700) is watched, a method of connecting to a peripheral device is described, by which the present invention is non-limited. For instance, the following materials may be processed through a home screen, a separately provided menu and the like irrespective of an application provided through a screen on a digital TV.

Referring to FIG. 8, the digital TV 700 provides a running screen of an application through a screen. Herein, the application may include every application runnable on the digital TV 700 as well as a broadcast program. Thus, the application runnable on the digital TV 700 may conceptually include data received from an external device (or server) by streaming as well as an application already downloaded & installed on the digital TV 700. Meanwhile, the external device may include one the aforementioned peripheral device.

While the application running screen is provided, if a control signal is received, the digital TV 700 confirms the received control signal and then performs an operation corresponding to the confirmed signal. For instance, if the control signal is a signal for requesting to provide a menu launcher, the digital TV 700 configures the menu launcher according to the control signal and then provides it to a prescribed region on a screen. In doing so, the menu launcher can be provided in various ways. For instance, as shown in FIG. 8, the menu launcher may be provided in a manner of overlaying or popping up from the application running screen currently provided through the screen, or being displayed on a full screen. Besides, the menu launcher may be provided by other methods failing to be illustrated or described.

The menu launcher 810 provided through the screen may include various menu items. According to the present invention, the menu launcher 810 may include items 820 and 830 capable of accessing information on peripheral devices connected or connectible to the main device 700.

Regarding the menu launcher 810 shown in FIG. 8, two menu items are exemplarily shown. The following description is made by taking a first menu item 820 and a second menu item 830 as examples. Herein, for clarity, the first menu item 820 and the second menu item 830 are sorted by communication protocols supportive of data communications between the main device 700 and the peripheral devices, by which the present invention is non-limited. The first menu item 820 is provided to access information on peripheral device(s) connected or connectible to the main device 700 according to Bluetooth communication protocol, while the second menu item 830 is provided to access information on peripheral device(s) connected or connectible to the main device 700 according to Wi-Fi communication protocol. Besides, the present invention is non-limited by the Bluetooth or Wi-Fi communication protocol.

If a signal of selecting the first menu item 820 or/and the second menu item 830 provided onto the menu launcher 810 in FIG. 8 is received, as shown in FIG. 10, the digital TV 700 may provide submenu items 1012, 1014 and 1016 for the peripheral devices currently connected or connectible to the digital TV 700 to the screen.

Meanwhile, referring to FIG. 11, unlike FIG. 8, the digital TV 700 provides a single menu item (External Input) 1110 onto the menu launcher.

If a signal for selecting the menu item 1110 is received through an input means such as a remote controller or the like, the digital TV 700 may provide a first menu item 1120 and a second menu item 1130. Herein, the first menu item 1120 and the second menu item 1130 may mean Bluetooth communication protocol and Wi-Fi communication protocol, which may have the same meanings of the first and second menu items 820 and 830, respectively.

In FIG. 11, if at least one of the first menu item 1120 and the second menu item 1130 is selected, submenu items 1122, 1124 and 1126 for the peripheral device(s) connected or connectible to the digital TV 200 based on the communication protocol according to the corresponding menu item can be provided. Meanwhile, unlike the former description, the submenu items 1122, 1124 and 1126 may be provided simultaneously together with the first menu item 1120 and the second menu item 1130 provided in response to the signal for selecting the menu item 1120.

Unlike FIG. 8, FIG. 9 shows that an icon 910 can be displayed on a prescribed region of the application running screen if a prescribed application is provided through the screen of the digital TV 700.

The icon 910 may be configured to execute a function similar to that of the first menu icon 810 or the second menu icon 820 described with reference to FIG. 8. Or, the icon 910 may be able to provide a list of external inputs 922, 924 and 926. And, such an external input list may be provided with an item 926 similar to the first menu item.

Regarding the aforementioned icon 910, a plurality of icons 910 may be provided to the application running screen. In doing so, the icons may correspond to the menu items shown in FIG. 8, respectively.

Meanwhile, the icon 910 shown in FIG. 9 may be provided by the digital TV 700 in case of a specific event only.

For instance, if the digital TV 700 receives a key signal corresponding to the aforementioned icon from a remote controller, as shown in FIG. 9, the icon 910 can be provided. Or, the digital TV 700 broadcasts or advertises to search for a peripheral device connected or connectible for data communication with the digital TV 700 periodically or aperiodically, thereby providing the icon 910 according to a corresponding result.

FIGS. 12 to 14 are diagrams of a user interface provided by a main device for connection/control of a peripheral device and the like according to one embodiment of the present invention.

The digital TV 700 may provide various types of user interfaces, popup messages (windows), OSD messages and the like (hereinafter named user interfaces) for data communications with one or more peripheral devices. And, the digital TV 700 may perform the data communications with one or more peripheral devices connected or connectible through the user interface. In the present specification, the data communication may include all the mutually performed cases (e.g., a signal sending/receiving case for mutual status check, mutual operation control, or the like) as well as a case of simply exchanging data mutually.

In the present specification, for clarity, such a user interface shall be described by being named a connectivity manager. For instance, such a connectivity manager may be provided by being named a Wi-Fi (connectivity) manager, a Bluetooth (connectivity) manager or the like according to a communication protocol for a paring between the digital TV 700 and peripheral device(s), a connection between the digital TV 700 and peripheral device(s), or the like.

For clarity of the following description, FIGS. 12 to 14 show one example of a connectivity manager 1210 provided by the digital TV 700 according to the present invention.

Namely, the digital TV 700 may provide one of the connectivity managers 1210 shown in FIGS. 12 to 14, or provide the connectivity managers 1210 in a manner of appropriately selecting/combining the connectivity managers 1210.

Meanwhile, the digital TV 700 may manually provide the connectivity manager 1210 for a control signal reception or the like through an input means such as a remote controller, a mobile terminal (for the purpose of controlling the digital TV through an application or the like) or the like. Or/and, the digital TV 700 may searches peripheral devices using at least one or more communication protocols periodically/aperiodically. If at least one peripheral device registered at the digital TV 700 according to a previous search or at least one peripheral device connectible despite not being registered at the digital TV 700 as a result of the search is found, at least one of the connectivity managers 1210 shown in FIGS. 12 to 14 may be provided by the digital TV 700.

Besides, for clarity of the description, although the connectivity manager 1210 shown in one of FIGS. 12 to 14 is displayed on a screen of the digital TV 700, the connectivity manager may be provided as audio through a speaker or other forms. And, the connectivity manager may be provided on another device.

A method of configuring the connectivity manager 1210 (i.e., user interface) is described with reference to FIGS. 12 to 14 as follows.

Referring to FIG. 12, the connectivity manager 1210 includes information of currently connected or connectible peripheral devices based on at least one communication protocol.

Herein, the information on the peripheral devices may include a device name of each peripheral device. The device name can be provided in a manner of being configured to be selectable by an input means, and may be edited by the input means or the like.

The information on the peripheral devices may include information on a function of a corresponding peripheral device. The function information of the peripheral device may be provided in a manner of being configured selectable like the aforementioned device name Meanwhile, the function information may be changeable into another function information as well. For instance, the function information of the peripheral device can be provided by a selection based on a type of the corresponding peripheral device, an attribute of the corresponding peripheral device, or the like, or may be provided in a manner of being determined automatically. If the function information of the peripheral device is the most basic function, when the peripheral device is an audio device for example, the function information may include a function related to audio play. The function information of the peripheral device may include a function used most frequently or last among functions of the peripheral device used for a previous connection in association with the corresponding peripheral device. Besides, the function information of the peripheral device may include an associated function among functions of the corresponding peripheral device with respect to an ongoing execution in the digital TV 700, a previous execution in the digital TV 700, an execution schedule in the digital TV 700, or the like. Hence, occasionally, the function information of the peripheral device may not be provided depending on a device. Meanwhile, it is not mandatory for the function information of the peripheral device to include a single information. And, a plurality of functions informations of the peripheral device can be provided.

The information on the peripheral devices may include information used shortly before by the corresponding peripheral device or information used for a previous connection by the corresponding peripheral device. For instance, if an image is previously outputted by being connected to a pocket photo, the information of the peripheral devices may include information on the corresponding image. If audio data is received and played through a mobile terminal previously, information on the played audio data may be provided. If the audio data is stopped or paused instead of being completely played, information on a play function is provided as the aforementioned function information and the audio data may be provided on the play list together.

In FIG. 12, the connectivity manager 1210 is configured in a manner of including a device name, a function information, a previous play information and the like.

A connectivity manager shown in FIG. 13 basically has a configuration similar to that of the former connectivity manager shown in FIG. 12. The former connectivity manager shown in FIG. 12 provides information on currently connected or connectible peripheral devices without distinction irrespective of a presence or non-presence of a history of a connection to or/and a registration at the digital TV 700. On the contrary, the connectivity manager shown in FIG. 13 provides such information distinguishably.

For instance, referring to FIG. 13, a first region 1310 of the connectivity manager provides information on peripheral device(s) having a history of a connection to or/and a registration at the digital TV 700, while a second region 1320 of the connectivity manager provides information on peripheral device(s) failing to do so.

Meanwhile, in providing the information on the peripheral devices, the connectivity manager shown in FIG. 13 may include a connection-impossible list despite being listed on the connectivity manager. So to speak, irrespective of a presence or non-presence of connectivity, the connectivity manager may list a device registered at the digital TV 700 as a peripheral device and provide the corresponding list. On the other hand, when the connectivity manager makes a list, if a status of a peripheral device is a currently connection-impossible status despite that the peripheral device is registered at the digital TV 700, the connectivity manager may provide the list in a manner of excluding the corresponding peripheral device from the list.

Referring to FIG. 13, as a result of checking a status of a corresponding device from the information on the peripheral devices provided through the first region 1310 of the connectivity manager and the information on the peripheral devices provided through the second region 1420, if a power of the corresponding peripheral device is turned off or it is determined that it impossible to connect to the corresponding peripheral device in consideration of a network situation such as a communication protocol or the like, the corresponding peripheral device may be listed in a manner of being discriminated from other devices. Moreover, the device discriminately provided may provide a device name information only without outputting function information or other information. Or, in the above description, the connectivity related function information may be additionally provided like power on/off of the corresponding peripheral device together with the device name information.

FIG. 14 shows a system similar to that shown in FIG. 13. FIG. 14 shows a system that a connectivity manager is configured depending on a presence or non-presence of current connectivity instead of a presence or non-presence of a history of connection or registration. A current connection available peripheral device is listed on a first region 1410 of a connectivity manager shown in FIG. 14, and a current connection unavailable peripheral device is listed on a second region 1420.

Regarding the cases shown in FIG. 13 and FIG. 14, information on a peripheral device provided through a connectivity manager may be listed in a manner of being sorted on the basis of a device type or attribute. For instance, a device can be listed in a manner of being sorted by an audio/video type, an image type, a presence or non-presence of a mobile terminal, a simple peripheral device type, and the like. Such a sorted listing may be performed based on various informations. For instance, in case that a digital TV 700 (i.e., a main device) and a peripheral device are paired, connected or the like based on Bluetooth communication protocol, a type identification of the peripheral device may use information defined in the communication protocol for example. So to speak, if Bluetooth communication protocol is taken as one example, the digital TV 700 can identify a type of the peripheral device based on COD (class of device) information. Meanwhile, the connectivity manager shown in one of FIGS. 12 to 14 may further provide a device identification icon to further facilitate recognition of the identified device as well as the aforementioned information.

As mentioned in the foregoing description, the method of configuring the connectivity manager according to the present invention may be implemented in various ways and is non-limited by the descriptions with reference to FIGS. 12 to 14. And, such a method may be also implemented in a manner of combing at least one of the descriptions with reference to FIGS. 12 to 14.

FIG. 15 and FIG. 16 are diagrams to describe a process for performing data communication between a digital TV and a pocket photo according to one embodiment of the present invention.

With reference to FIG. 15 and FIG. 16, described is a method of connecting and performing data communication between a digital TV and a pocket photo (i.e., a peripheral device).

Referring to FIG. 15, a digital TV 700 provides a connectivity manager on which a device name information, a previous use information and a function information (print) of a photo pocket are included. Herein, if a user accesses the pock photo provided on the connectivity manager, data communication is performed between the digital TV 700 and the pocket photo.

In doing so, the data communication may be determined according to the information accessed by the user among the informations currently provided for the pocket photo on the connectivity manager. For instance, if the user accesses the information on the device name on the connectivity manager, the digital TV 700 can prepare for the pairing or connection with the pocket photo and the like. And, the digital TV 700 may provide additional information on the preparation. The additional information may include the previous access information, the function information and the like. If the previous access information is selected instead of the device name, the previous access information may be outputted or function information on the previous access information may be provided. If the function information is accessed, a control command corresponding to the accessed function information is sent to a corresponding peripheral device so that the corresponding function can be directly launched in the peripheral device. Such material is applicable to the preset specification overall.

One example of the data communication method between the digital TV 700 and the pocket photo 728 described with reference to FIG. 15 is described with reference to FIG. 16 as follows. Meanwhile, for clarity, assume that the data communication is performed based on Bluetooth communication protocol. In doing so, assume that peripheral devices of the digital TV 700 include a sound bar 724, Rolly keyboard 716 and the like.

The digital TV 700 or a controller thereof (hereinafter called a controller) establishes Bluetooth communication connection to the pocket photo 728 [S1602]. If connected to the pocket photo 728, the controller receives a major command (e.g., print, etc.) from the pocket photo 728 [S1604] and saves a connection address information (e.g., MAC address of the pocket photo 728, etc.), command information and the like to a memory. And, information on the data communication with the pocket photo 728, function execution and the like is saved to the memory as well [S1606].

Through the steps S1602 to S1606, the pocket photo 728 may perform a connection history or/and registration on the digital TV 700.

Thereafter, if the digital TV 700 is rebooted [S1608], all Bluetooth connections including the pocket photo connection are released [S1610].

Subsequently, the controller calls a connectivity manager 1210 on the digital TV 700. If a function information (print) of the pocket photo 728 is selected [S1612], the controller makes a request for Bluetooth connection to the pocket photo 728 [S1614]. The Bluetooth connection to the pocket photo 728 may be performed through an OPP (object push profile), which is used to transceive text, image, video, vCard and the like, as one of Bluetooth profiles for example.

If connected to the pocket photo 728 [S1616], the controller sends data related to the function information (print) [S1618]. The pocket photo 728 then receives the data sent in the step S1618 and then performs an operation corresponding to the function information. For instance, if the data and the function information include image data and print, respectively, the pocket photo 728 prints the received image data.

FIG. 17 and FIG. 18 are diagrams to describe a method of performing data communications with peripheral devices of the same attribute in a main device according to one embodiment of the present invention.

With respect to the present invention, a single main device and a single peripheral device are not mandatory. And, a plurality of main devices and a plurality of peripheral devices can exist. If there are a plurality of main devices or a plurality of peripheral devices, it is not necessary for them to have the same type, the same attribute and the like.

Yet, for clarity of the descriptions with reference to FIG. 17 and FIG. 18, assume a case that a data communication with a second peripheral device of a same type or attribute of a first peripheral device is attempted or used on a connectivity manager in the course of performing a data communication with the first peripheral device. In doing so, for clarity of the following description, a communication protocol between a main device and peripheral devices includes Bluetooth communication protocol for example.

In FIG. 17 (a) or FIG. 17 (b), a connectivity manager including information on peripheral devices of an audio/video type or attribute is illustrated.

Referring to FIG. 17 (a), a first peripheral device LASxx is selected from the peripheral devices of the audio/video type. Yet, since second and third peripheral devices of the audio/video type are not selected, they are provided in a manner of being discriminated from the first peripheral device. According to the former embodiment, as mentioned in the foregoing description, a connection unavailable peripheral device is discriminated only. Yet, the present invention can discriminate a selected device and an unselected device from each other in a similar manner.

Referring to FIG. 17 (b), while a data communication is performed in a manner that a controller selects the first device, the controller selects the second peripheral device HBSxx and performs a data communication. It can be observed that a connectivity manager shown in FIG. 17 (b) is different from that shown in FIG. 17 (a). Namely, on the connectivity manager shown in FIG. 17 (b), only the second peripheral device provided as activated but the first and third peripheral devices are provided as deactivated.

The operations shown in FIG. 17 (a) and FIG. 17 (b) are described in detail with reference to FIG. 18 as follows. Herein, a sound bar LASxx 724 and a headset HBSxx 722 are taken as examples of first and second peripheral devices of the same attribute, respectively.

A controller of a digital TV establishes Bluetooth connection to the sound bar 724 and receives a major command from the Bluetooth-connected sound bar 724 [S1802, S1804].

The controller saves Bluetooth MAC address, device name and function information of the sound bar 724 and the like to a memory in association with a connectivity manager [S1806].

The controller sends audio data desired to be outputted to the connected sound bar 724, and the sound bar 724 then outputs the audio data [S1808, S1810].

While the sound bar 724 is outputting the audio data in the step S1810, if the controller receives a request for a connection to the headset 722 [S1812], the controller releases the connection from the sound bar 724 [S1814] and makes a request for Bluetooth connection to the selected headset 722 [S1816]. The Bluetooth connection request to the headset 722 may be performed through OPP as well.

If the Bluetooth connection to the headset is complete, the controller sends audio data to the headset 722, and the headset 722 outputs the audio data [S1818, S1820, S1822].

Embodiments for performing data communication between a plurality of peripheral devices through a single main device are shown in FIGS. 19 to 21 and FIGS. 22 to 24, respectively.

FIGS. 19 to 21 are diagrams to describe a method of performing data communications between a main device and a plurality of peripheral devices according to one embodiment of the present invention.

For instance, according to a case shown in FIGS. 19 to 21, a digital TV 700 is connected to a first peripheral device (e.g., a camera) 714, receives image data from the first peripheral device 714, outputs the received image data to a screen, and intends to output the data of the first peripheral device 714, which is outputted from the digital TV 700, through a second peripheral device 728 simultaneously or thereafter.

Referring to FIG. 19, a connectivity manager includes information on 3 peripheral devices.

The first peripheral device is a camera. The camera may be connected or connectible to the digital TV 700 based on Wi-Fi communication protocol.

The second peripheral device is a pocket photo. The pocket photo may be connected or connectible to the digital TV 700 based on Bluetooth communication protocol.

The third peripheral device is a mobile terminal. The mobile terminal may be connected or connectible to the digital TV 700 based on Bluetooth communication protocol.

With respect to the respective peripheral devices, the connectivity manager may provide device name information, function information, previous use information and the like and at least one of icons according to a communication protocol and a device type identification.

Meanwhile, the connectivity manager may separately provide a function item (e.g., VIEW, PRINT, PLAY, etc.) related to the function information on the peripheral device.

As mentioned in the foregoing description, data communications among the digital TV (i.e., main device) 700, the first peripheral device 714 and the second peripheral device 729 are described with reference to FIGS. 19 to 21 as follows.

Referring to FIG. 20, regarding the relation to the peripheral device selected through the connectivity manager, the digital TV 700 may receive data from the first peripheral device 714 by DLNA (digital living network alliance) and send data to the second peripheral device 728 through OPP.

A method of data communication between the devices is described in detail with reference to FIG. 21. In FIG. 21, for clarity, the digital TV 700, the first peripheral device 714 and the second peripheral device 728 are illustrated only.

If connected to the first peripheral device 714, a controller of the digital TV receives image data, a display function execution request and the like [S2102, S2104, S2106]. The controller controls the received image data to be outputted to a screen [S2108]. If necessary, the controller performs editing and the like using an editing tool, an editing application and the like [S2110].

If a connective manager is called and the second peripheral device 728 is selected, the controller makes a request for a connection to the selected second peripheral device 728 and the OPP. If the connection is complete, the controller delivers image data, which is currently displayed on the screen of the digital TV, to the connected second peripheral device 728 [S2112, S2114, S2116, S2118].

The second peripheral device 728 prints the received image data [S2120].

Meanwhile, in FIG. 21, since the first peripheral device 714 and the second peripheral device 7289 differ from each other in communication protocol or type or attribute, simultaneous connections may be established. Hence, the steps such as the connection, the connection request, and the connection completion can be performed in advance. Moreover, in FIG. 21, when the digital TV 700 receives and delivers data of the first peripheral device 714 or performs functions, the digital TV 700 may save the data to a buffer or memory and then perform the aforementioned steps step by step. Or, the digital TV 700 may deliver the data directly without temporary storage or saving. In the above description, the digital TV 700 may directly deliver the data received from the first peripheral device 714, or may process and then deliver the data. For instance, since a change or the like may be necessary according to a type or communication protocol of the first peripheral device 714 or the second peripheral device 728 or properties such as performance of a device such as a decoder, an encoder or the like, resolution of each peripheral device and the like are necessary to be considered, the data may be processed and then delivered.

FIGS. 22 to 24 are diagrams to describe a method of performing data communications between a main device and a plurality of peripheral devices according to another embodiment of the present invention.

In FIG. 22, a first peripheral device SONYxx and a second peripheral device G5 are included on a connectivity manager.

Referring to the connectivity manager shown in FIG. 22, the first peripheral device is connected and activated currently. The second peripheral device is not currently connected and deactivated despite being listed. In such a case, a processing method is illustrated.

For instance, referring to FIG. 23, a digital TV 700 receives data from a first peripheral device 714 currently activated. In doing so, the digital TV 700 intends to deliver the data received from the first peripheral device 714 to a second peripheral device 730 currently deactivated. In this case, the digital TV 700 may perform a reserved transmission function of the data through the connectivity manager shown in FIG. 22 or a menu or the like of the digital TV 700 shown in FIG. 23.

Thus, if the reserved transmission function is activated, the digital TV 700 temporarily saves the corresponding data. Thereafter, if a peripheral device related to the reserved transmission function is listed or activated, a function icon 2310 related to the reserved transmission function is provided to a screen. And, the related data can be delivered to the corresponding peripheral device, i.e., the second peripheral device 730 automatically or in response to a selection of the function icon 2310.

Referring to FIG. 24, a digital TV controller is connected to the first peripheral device 714 and then receives image data and the function information [S2402, S2404, S2406].

The controller saves the received image data [S2408]. If a connection to the first peripheral device 714 is released or the second peripheral device 730 is selected by calling the connectivity manager separately, the controller makes a request for a connection to the second peripheral device 730 [S2410, S2412, S2414]. Thereafter, if the connection to the second peripheral device 730 is completed [S2416], the controller notifies a presence of data related to a reservation function through an icon and the like [S2418]. If there is a response from the second peripheral device 730 [S2420], the controller delivers the related data to the second peripheral device 730 [S2422].

According to the various embodiments of the present invention mentioned in the foregoing description, data communications are facilitated among a plurality of digital devices. Data communications with peripheral device(s), controls and the like can be performed intuitively using a main or control device among a plurality of the digital devices. A plurality of peripheral devices can be controlled sequentially or simultaneously through a single main device. An operation control, status check and the like of each peripheral device are further facilitated. Therefore, the present invention can enhance usability and convenience thereof.

A digital device and data processing method therein disclosed in the present specification may be non-limited by the configurations and methods of the embodiments mentioned in the foregoing description. And, the embodiments mentioned in the foregoing description can be configured in a manner of being selectively combined with one another entirely or in part to enable various modifications.

Meanwhile, a digital device operating method disclosed in the present specification can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations such as transmission via Internet. Further, the recording medium readable by a processor is distributed to a computer system connected to a network, whereby codes readable by the processor by distribution can be saved and executed.

Besides, the description in the present specification is made with reference to the accompanying drawings, which shows embodiments only without being limited by a specific embodiment. Thus, it is intended that the present invention covers the modifications and variations of this invention provided they come within the scope of the appended claims and their equivalents. And, such modifications and variations should not be individually understood from the technical idea of the present invention.

MODE FOR INVENTION

The various modes for the present invention are described fully in the above Best Mode item.

INDUSTRIAL APPLICABILITY

The present invention has an industrial applicability, because the present invention relates to a digital device, and more particularly, to a digital device and method of processing data therein, which is particularly suitable for data communications of one or more digital devices connected to one digital device via network.

The invention claimed is:
1. A digital television, comprising:
a communication interface unit;
a display; and
a controller configured to:
search for all peripheral devices available for connection with the digital television;
display, via the display, a connectivity manager including a plurality of peripheral devices available for connection with the digital television based on the search along with a corresponding last function used for a previous connection with the digital television for each device of the plurality of peripheral devices available for connection;
connect, via the communication unit, to a first peripheral device of the plurality of peripheral devices available for connection and transmit, via the communication unit, a first control signal based on a selection of the corresponding last function on the displayed connectivity manager such that the corresponding last function is executed at the first peripheral device;
receive first data from the connected first peripheral device;
connect to a second peripheral device of the at least one peripheral device; and
transmit the first data to the connected second peripheral device,
wherein the controller is further configured to:
identify a type of the first peripheral device and a type of the second peripheral device;
release the connection to the first peripheral device based on the type of the selected second peripheral device being the same as the type of the first peripheral device; and
maintain connection to both the first peripheral device and the second peripheral device based on a communication protocol between the first peripheral device and the digital television being different from a communication protocol between the digital television and the selected second peripheral device, and there being a margin for a communication related resource of the digital television.

2. The digital television of claim 1, wherein the controller is further configured to transmit a control command for a function execution of the second peripheral device related to the first data while sending the first data to the connected second peripheral device.

3. The digital television of claim 1, wherein the controller is further configured to display content via the display such that the displayed connectivity manager overlays the displayed content.

4. The digital television of claim 1, wherein the controller is further configured to display the connectivity manager in response to a selection of a menu item included in a menu called through an input means or an icon according to a peripheral device search on a prescribed region.

5. The digital television of claim 1, wherein the controller is further configured to determine a configuration of the connectivity manager depending on a presence or non-presence of a previous connection history or a history of registration at the digital device.

6. The digital television of claim 1, wherein the controller is further configured to change an operation according to a type of a communication protocol used in the course of connecting to the first peripheral device and the second peripheral device.

7. The digital television of claim 1, wherein the controller is further configured to communicate with the first peripheral device and the second peripheral device based on at least one of Wi-Fi communication protocol or Bluetooth communication protocol.

* * * * *